United States Patent
Payne et al.

[11] 3,866,496
[45] Feb. 18, 1975

[54] SHEETBOARD CUTTING MACHINES

[76] Inventors: Marion L. Payne, 8403 Claremont, N.E., Albuquerque, N. Mex. 87112;
Marion A. Payne, 908 N. Howard, Carlsbad, N. Mex. 87220

[22] Filed: Aug. 16, 1973

[21] Appl. No.: 388,803

[52] U.S. Cl..................... 83/471.3, 83/486, 83/574
[51] Int. Cl............................ B23d 45/02, B27b 5/06
[58] Field of Search....... 83/471.3, 471.2, 486, 488, 83/487, 489, 462, 455, 574, 368

[56] References Cited
UNITED STATES PATENTS

| | | | |
|---|---|---|---|
| 2,502,640 | 4/1950 | Coleman | 83/471.3 X |
| 2,833,320 | 5/1958 | Bennett | 83/574 X |
| 2,973,020 | 2/1961 | Bennett | 83/574 X |
| 3,283,790 | 11/1966 | Striebig | 83/471.3 |

*Primary Examiner*—Donald R. Schran
*Attorney, Agent, or Firm*—Robert M. Betz; Richard A. Bachand

[57] ABSTRACT

A portable sheetboard cutting machine of the type in which a saw is slidably mounted on guide rails which extend upwardly across and in front of a work supporting frame. The guide rails may be moved horizontally along the frame and rotated in a plane parallel to the frame into any desired angular position with respect to the vertical. In this way, the operator can make both horizontal and angular cuts without moving the sheetboard on the frame.

10 Claims, 9 Drawing Figures

SHEETBOARD CUTTING MACHINES

BACKGROUND

1. Field of the Invention

This invention relates generally to the field of sheetboard cutting machines and, more particularly, to machines of this type in which a portable saw is mounted for travel along a pair of upstanding guide rails.

2. Description of the Prior Art

The art of sheetboard cutting machines is well-established. As exemplified by U.S. Pat. No. 2,833,320, such a machine employs an upstanding frame or other work supporting surface against which the plane of a sheetboard rests. The work, for example, a board to be cut may be supported on a bottom edge upon a so-called fence, which extends in a horizontal plane along the front of the frame. A portable saw is fixed to a saw mounting assembly, which is in turn adapted to move slidably up and down along a pair of upstanding guide rails attached to, or supported by, the frame. The saw mount assembly is provided with a rotatable turntable, which carries the saw, so that the sawblade can be oriented and locked in either a vertical or a horizontal position. In operation, the saw mounted assembly is moved along the rails in making a vertical cut through the sheetboard. To make a horizontal cut, however, it is necessary to slide the sheetboard past the saw blade, which has been properly positioned with the aid of the turntable. The machine may only be operated, therefore, in a space large enough to accommodate the horizontal travel of the board involved in making a particular cut. Such a machine is also unable to make a cut at any angle other than the vertical or horizontal.

Prior art panel board cutting machines, such as disclosed in U.S. Pat. No. 3,565,139, incorporate a saw mounting assembly which is provided with means for rotating the saw supporting turntable at right angles to the direction of the guide rails and locking in such position. Because in this apparatus there is no possible cut through the board that can be made with the plane of the saw blade at some intermediate angle between the vertical and the horizontal, there is understandably no provision for locking the saw blade at such an intermediate position.

A further limitation of machines of the type described lies in the fact that the only way to adjust the depth of cut is to change the position of the saw with respect to the saw mounting assembly. No means are provided for varying the clearance between the guide rails and the frame to accommodate work of varying thicknesses. Such a capability has particular advantage when woodworking equipment with little or no variability in depth setting is mounted on the slidable turntable assembly.

SUMMARY OF THE INVENTION

In the light of the foregoing, it is, therefore, a general object of this invention to provide a portable sheetboard cutting machine in which horizontal cuts through the board may be made without advancing the board itself.

It is a further object of this invention to provide a portable sheetboard cutting machine in which cuts may be made through the board at angles intermediate between the vertical and the horizontal.

It is a still further object of this invention to provide a sheetboard cutting machine of the type described wherein the clearance between the saw mount assembly and the sheetboard may be adjusted.

Other objects and advantages of this invention will become apparent from consideration of the detailed description and drawings appended thereto, or as otherwise set forth in claims forming a part of this application.

In accordance with the preferred embodiment of this invention, a portable sheetboard cutting machine comprises, in summary, an upstanding work supporting frame, a fence mounted in front of the frame adapted to support the sheetboard edgewise, a pair of upstanding parallel guide rails disposed across the width of the frame, a saw mounting assembly slidably supported on the guide rails, means connected adjacent the top and bottom of the frame for supporting the guide rails in horizontally slidable relation to the frame and means operatively connected to such supporting means for rotating the guide rails in a plane parallel to the frame through a predetermined angle with respect to the vertical. Means are additionally included for varying the frontal clearance between the saw mount assembly and the frame, including elongated horizontal braces of adjustable length.

DETAILED DESCRIPTION

Figure 1:
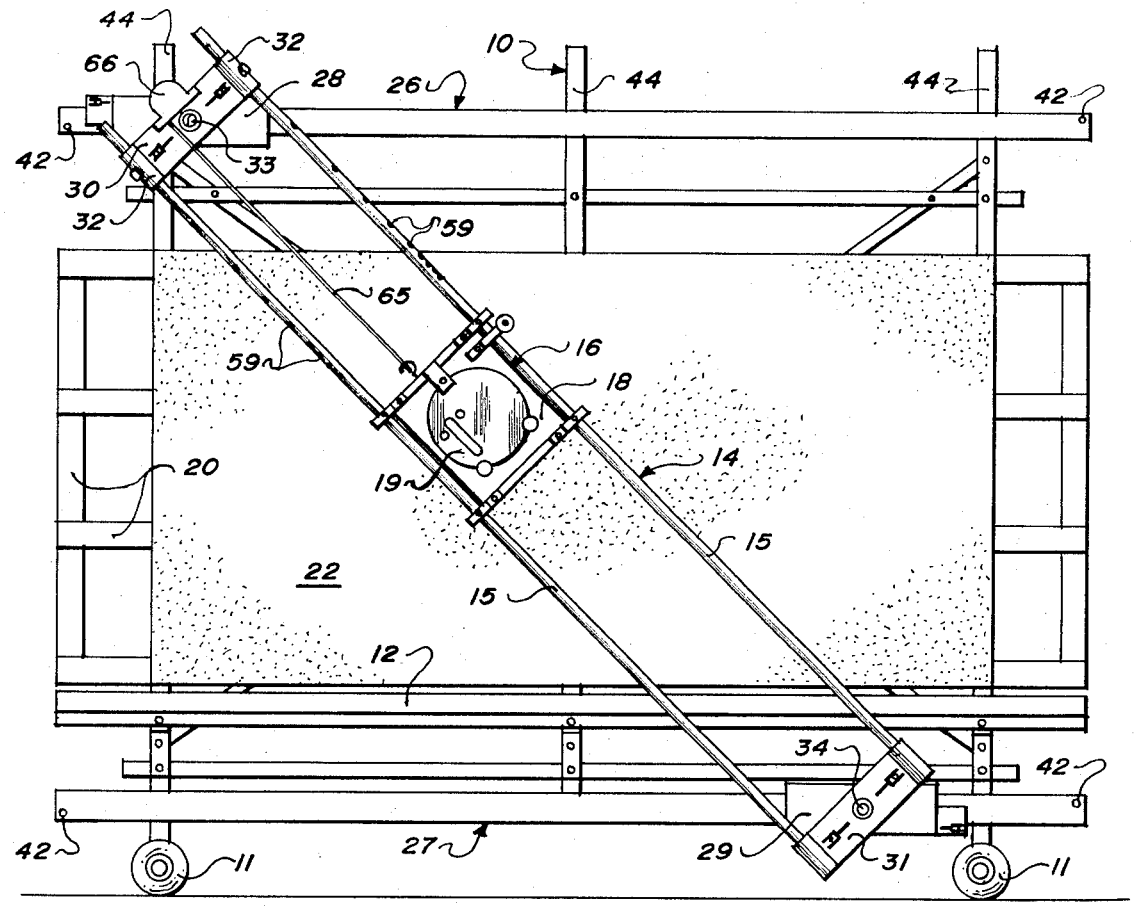
FIG. 1 is a front elevational view of the apparatus of this invention.

With reference now to FIG. 1, the apparatus of this invention includes an upstanding metal support frame 10, preferably composed of spaced apart vertical and horizontal members and angular cross braces as shown. The frame 10 is adapted to provide support for a sheetboard or panelboard which is laid against it and is rendered mobile by a pair of wheels 11. Extending horizontally along the front of the frame 10, a fence 12 is attached thereto which provides a flat surface or ledge against which the work may rest edgewise.

A saw guide 14, lying generally in a plane parallel to the support frame 10 extends upward across the width of the frame 10 and is supported thereby. The saw guide 14 includes a pair of spaced apart parallel guide rails 15—15 on which a saw mount assembly 16 is slidably mounted. The assembly 16 includes a rectangular baseplate 18 which engages the guide rails 15—15 at its four corners and a turntable 19 rotatable on said baseplate 18. The turntable 19 is adapted to carry a portable saw (not shown) whose blade may be oriented at any desired angle. Without departing from the basic elements of this invention, it will be apparent from what follows that the turntable 19 is equally adapted to support other woodworking tools, such as planers and routers.

A wooden backing frame 20 consisting generally of spaced apart slats as shown is fastened by any suitable means to the front of the frame 10 and provides a backing for a table 22, such as of pressed wood fibers, against which the work is placed. In a cutting operation, the saw blade cuts into the table 22 which may be replaced. The table 22 is fastened to the backing frame 20 so that its bottom edge lies slightly above the upper surface of the fence 12. This prevents a buildup of sawdust and debris on this upper surface.

Top and bottom tracks 26 and 27 extend horizontally adjacent the top and bottom, respectively, of the frame 10 and are adjustably supported thereby as hereafter explained. Upper and lower support plates 28 and 29 are adapted to slidably engage the top and bottom tracks 26 and 27, respectively, in a manner to be further detailed. A pair of pivot plates 30 and 31 interconnecting the guide rails 15—15 adjacent their upper and lower ends are pivotally joined to the support plates 28 and 29 respectively. As will become apparent, the mobility of the saw guide 14 in a plane parallel to that of the frame 10 is made possible by the horizontal movability of the support plates 28 and 29 in cooperation with and the rotation thereagainst of the pivot plates 30 and 31.

Figure 2A:
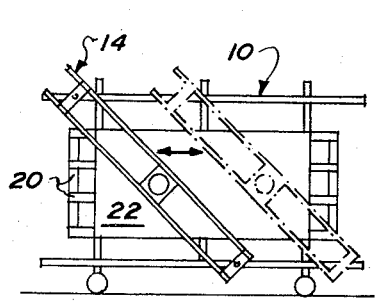
FIGS. 2(a), 2(b) and c) are simplified front elevations of the apparatus of this invention showing permissible operating ranges of the movable saw guide thereof.
Figure 2B:
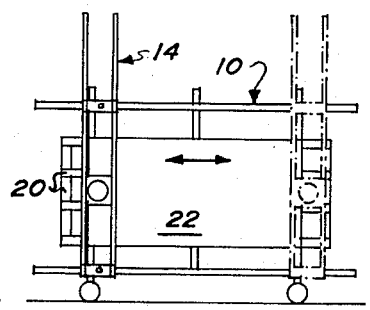
Figure 2C:
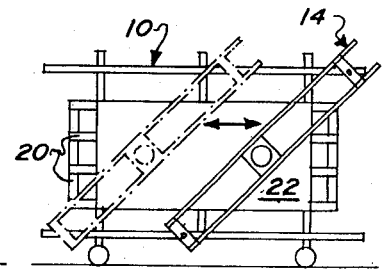

With more particular reference now to the skeletonized views of FIGS. 2(a),2(b) and c), it may be seen that the saw guide 14 with its associated saw mounted assembly 16 may be inclined to the left, as seen in FIG. 2(a), placed vertically as in FIG. 2(b), or be inclined to the right as in FIG. 2(c). Also, it is apparent from these figures that in any of these three attitudes the saw guide 14 can be shifted horizontally in the direction of the arrows as shown with respect to the frame 10.

If the turntable 19 and hence a saw blade extending therefrom toward a sheetboard is rotated so that the blade aligns longitudinally with the guide rails 15—15, a cut can be made through the sheetboard either vertically or along any of a selected variety of diagonal paths. If, however, the saw blade is rotated into a horizontal plane, a horizontal cut may be made through the sheetboard by moving the saw guide 14 along the frame 10 while the sheetboard remains immovable. As will become clear, such a horizontal cut may be made in this fashion with the saw guide 14 in any of the attitudes shown in FIGS. 2(a), 2(b) or 2(c).

The bottom ends of the guide rails 15—15 are fixed to the pivot plate 31, while portions of the guide rails 15—15 extending upward of the saw mount assembly 16 are adapted to slidably engage the pivot plate 30. Inspection of FIGS. 2(a), 2(b) and 2(c) shows that as the saw guide 14 is pivoted from the position in FIG. 2(a) to that in FIG. 2(b) to accommodate the shorter length of the guide rails 15—15 extending between the top and bottom tracking member 26 and 27, the guide rails 15—15 slide upward with respect to the pivot plate 30. Conversely, as the saw guide 14 continues to pivot into the attitude of FIG. 2(c), the guide rails 15—15 slide downward with respect to the pivot plate 30. It should be understood that a variation in angular attitude of the saw guide 14 may be accomplished by holding the lower support plate 29 fast and moving the upper support plate 28 only, or alternatively, by moving the upper and lower support plates 28 and 29 simultaneously in opposite directions.

Guide Rail Support and Movement

As seen in FIG. 1, a pair of parallel upwardly extending sleeves 32—32 are secured to the forward surface of the upper pivot plate 30 and adapted to receive therethrough the upper ends of the two guide rails 15—15. A pivot bolt 33 (FIGS. 1, 3, and 4) secures the pivot plate 30 in rotatable relation to the support plate 28 while in like manner a similar pivot bolt 34 secures the pivot plate 29 to the support plate 31 (FIG. 1).

When the angular attitude of the saw guide 14 is varied, the guide rails 15—15 will slide either upward or downward through the sleeves 32—32 while the pivot plates 30 and 31 simultaneously turn against the support plates 28 and 29.

Figure 4:
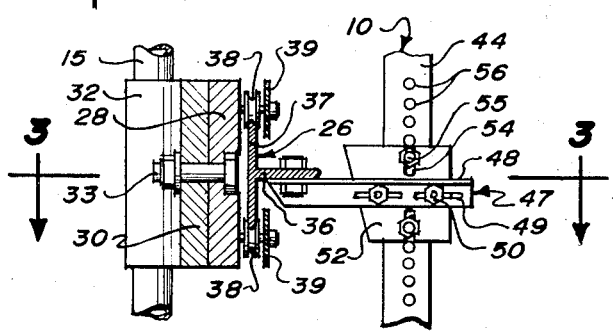
FIG. 4 is a sectional view taken on line 4—4 in FIG. 3.

The top and bottom tracks 26 and 27 are of equivalent construction, and, therefore, the detail of FIG. 4 relating to the track 26 is in the form of a T-bar including an elongated connector plate 36 lying in a horizontal plane and an upstanding roller guide plate 37 disposed at right angles thereto along its front edge so that the parallel top and bottom edges of the roller guide plate 37 also extend horizontally.

Rollers 38—38, mounted on horizontal pins extending between the rear face of the support plate 28 and a parallel roller support plate 39 behind it, are adapted to engage the top and bottom edges of the roller guide plate 37. This "hangs" the support plate 28, and hence the saw guide 14, on the roller guide plate 37, and permits horizontal movement of the support plate 28 with respect to the top track 26.

With similar connections between the support plate 29 and the bottom track 27, the interconnected saw guide 14 will be easily moved along the frame 10. In order to limit the horizontal travel of the saw guide 14, stop pins 42 project forwardly from the top and bottom roller guide plates 37 at their extremities in the path of the support plates 29 and 29.

It is a feature of this invention now to be described in more detail that the frontal spacing between the saw guide 14 and the frame 10 is adjustable to enable the operator to vary the clearance between the saw mount assembly 16 and the table 22. In FIG. 4, interconnections for this purpose are shown between the top track 26 and one of three vertical posts 44—44 positioned at opposite sides and in the middle of the frame 10. Similar connections (not shown) are made at the other end of the track 26 and between the bottom track 27 and the bottom ends of the same vertical posts 44—44.

With reference, therefore, to FIG. 4, a track positioning assembly 47 includes an elongated angle iron 48 extending at right angles to the post 44, so that the forward extremity of its horizontal surface projects beneath the connector plate 36 to which it is bolted. The vertical surface at the rear extremity of the angle iron 48 is provided with horizontal slots 49 through which adjustable bolts 50 past to secure the angle iron 48 to a vertical hangar plate 52 lying flush with such vertical surface. A similar pair of vertically aligned slots 54, in the hangar plate 52, are adapted to receive bolts 55 extending within any two appropriately spaced members of a series of vertical positioning holes 56 in post 44.

If it is desirable to change the frontal clearance between the saw mount assembly 16 and a sheetboard, the bolts 50 are loosened on all six of the track positioning assemblies 47 on the frame 10 and the angle irons 48 are shifted forward or back with respect to the hangar plates 52, carrying the top and bottom tracks 26 and 27 with them in a horizontal direction. If it is desirable to shorten or lengthen the vertical spacing between the top and bottom tracks 26 and 27, this may be done by loosening bolts 55 and shifting the hangar plates 52 up or down carrying the angle irons 48 with them in a vertical direction.

In order to prevent interference with the fence 12, the three hangar plates (not shown) associated with the bottom track 27 are preferably not vertically adjustable, but are fixed respectively to the appropriate vertical posts 44—44.

The value of the track positioning assembly 47 is now seen to be that it eliminates the need for making separate adjustment of the depth of the saw blade to accommodate differing thicknesses of sheetboard. While the depth of cut of a saw blade with a conventional portable saw is adjustable, it is with the aid of this invention possible to use larger saws with larger blades which would not be adjustable to a usable depth with certain thicknesses of work. Furthermore, planers and routers with which the turntable 19 of this invention may be used are generally provided with no appreciable depth adjustment. Therefore, with such tools the only way to significantly vary the clearance to different thicknesses of work is with the aid of the features of this device just discussed.

Locking Features

After rotating the guide frame 14 into a desired angular position, the guide rails 15—15 are prevented from further sliding movement within the sleeves 32—32 by inwardly turning a pair of lock screws 58—58 (FIG. 3) so that they engage a corresponding pair of holes 59—59 of which there are a plurality recessed at appropriate intervals along the guide rails 15—15 (FIG. 1). The spacing between successive pairs of holes 59—59, of course, increases with the degree of variation of the saw guide 14 from the vertical.

If the saw guide 14 is positioned vertically, the pivot plates 30 and 31 align with and cover the support plates 28 and 29 so that a pair of spring biased quick release cam locks 60—60 (FIG. 3) may interconnect these two pairs of plates to prevent relative rotation thereof.

Figure 3:
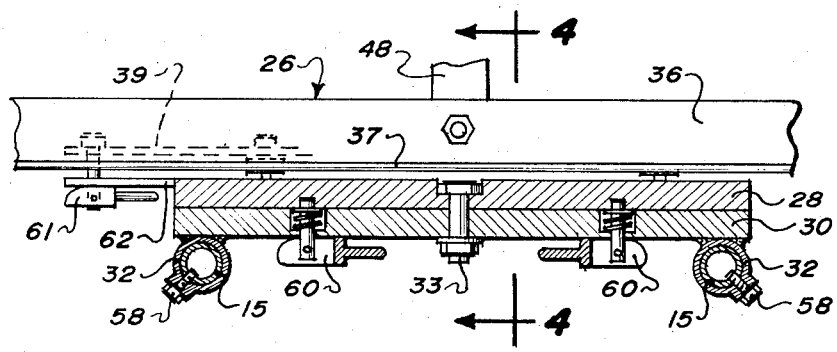
FIG. 3 is a sectional view in plan at enlarged scale taken on line 3—3 in FIG. 4 of the support plate and pivot plate for the saw guide secured to the upper end of the guide rails.

In order to prevent the support plates 28 and 29 from moving along the rails 37 at the top and bottom of the frame 10 when making a vertical or angular cut, cam-type locks such as shown as reference numeral 61 are adapted to interconnect flexible extension 62 of the rear surface of the support plate 28 and the adjacent roller support plate 39. This cam lock interconnection actually lies above the top edge of the rail 37 (as best seen in FIGS. 3 and 4). The cam lock 61 is actuated to urge the facing surfaces of these two plates inwardly against the rail 37 to block travel of the rollers 38—38. A similar cam lock (not shown) interconnects the support plate 29 and a roller support plate associated therewith.

Saw Mount Assembly

Figure 5:
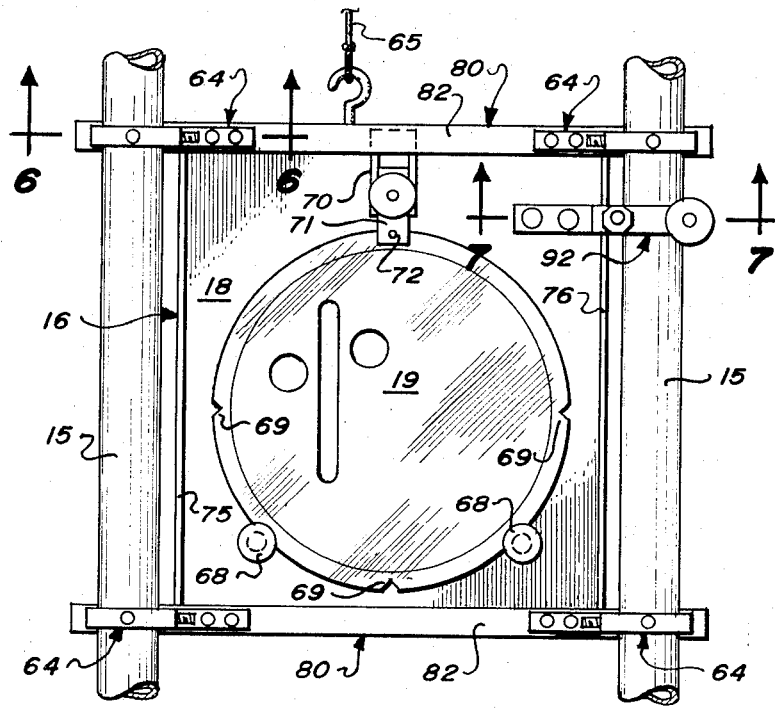
FIG. 5 is a front elevational view of the saw mount assembly.

The baseplate 18 is adapted to slidably engage the guide rails 15—15 by means of four adjustable alignment brackets 64—64, as best seen in FIG. 5. The entire saw mount assembly is movable longitudinally along the guide rails 15—15 through a cable 65 feeding upwardly to a counter balanced recoil spring supported within a housing 66 (FIG. 1). The cable and spring are conventional and form no part of this invention.

The circular turntable 19, preferably of transparent resilient plastic, such as that commercially sold under the trademark Lucite, shown with conventional cutouts to accommodate a portable saw, consists of a single flat plate concentric with and of slightly larger diameter than an opening in the baseplate 18. The edge of the turntable 19 rests against a pair of guide rollers 68—68 extending above the baseplate 18 and may be conveniently rotated continuously into any position by grasping the saw itself. The guide rollers 68—68 are provided with flanges as shown extending over the surface of the turntable 19 to hold it flush with the baseplate 18. A plurality of fiduciary notches 69 may be cut at any desired intervals into the periphery of the turntable 19. A slidable locking device mounted at the top of the baseplate 18 consists of a frame 70 supporting a slide bar 71 terminating at one end in a stop pin 72 and movable downwardly parallel to the baseplate 18 to engage any of the notches 69. In this manner, the turntable 19 is locked in any desired rotational position.

The edges of the baseplate 18 are turned up to form upstanding flanges 75 and 76 parallel to the guide rails 15—15 and a pair of like parallel flanges extending laterally between said guide rails 15—15. As best understood by considering FIGS. 5 and 6 together, the upper of said laterally extending flanges, identified by reference 77, forms a support for two of the alignment brackets 64 while the lower of such lateral flanges (not seen) provides support for the remaining two of said brackets 64.

Figure 6:
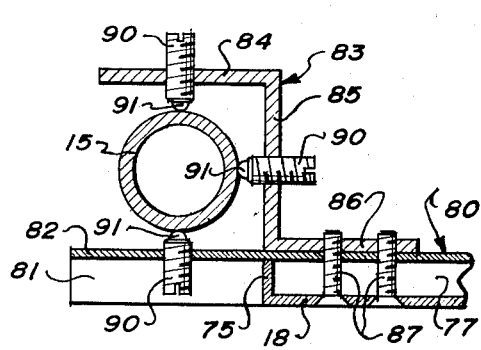
FIG. 6 is a sectional view on line 6—6 in FIG. 5.
Figure 7:
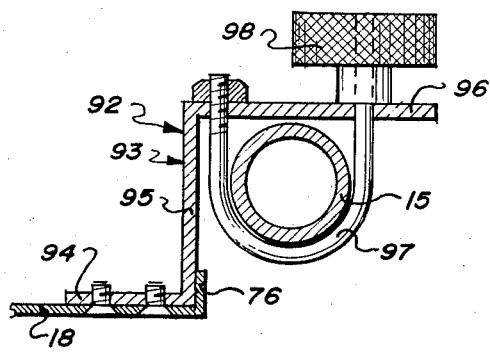
FIG. 7 is a sectional view taken on line 7—7 in FIG. 5.

The two upper brackets 64 are joined by an angle iron 80 fitting against the flange 77 and projecting beyond its two ends and the two lower brackets 64 are joined by another such angle iron 80 in the same fashion. As seen in the detail of FIG. 6, showing the upper left hand bracket 64, one of the two right angle sides 81 of the angle iron 80 interfaces with the flange 77 and the other side 82 lies parallel to the surface of the baseplate 18. Two legs 84 and 85 of a double L-shaped member 83, together with an overhanging end of the side 82, form a three-sided cradle for one of the guide rails 15—15. At the same time, the remaining leg 86 of the member 83 interfaces with the upper surface of the side 82 to which it is secured as by bolts 87. Adjustment screws 90—90 extending inwardly from side 82 and legs 84 and 85 toward the surface of the guide rail 15 are provided at their inner ends with ball-bearings 91—91. The surface of the guide rail 15 is slidably engaged with the ball-bearings 91—91. The screws 90 may be adjusted selectively on any of the four brackets 64—64 for precise alignment of the baseplate 18 and consequently of a sawblade or other woodworking tool with respect to the surface of a sheetboard.

It is, of course, necessary to be able to secure the saw mounting assembly 16 in any given position along the guide rails 15—15 when performing a cut with the apa apparatus of this invention which involves horizontal movement of the guide frame 14. For this purpose, a rail lock assembly 92 comprises a double L-shaped member 93 having a leg 94 bolted to the bottom of the baseplate 18, an intermediate leg 95 interfacing the flange 76, and a leg 96 extending over and across a guide rail 15. A flexible U-bar 97 surrounds the underside of the guide rail 15, one of its ends being secured to the leg 96 and the other projecting therethrough to threadably engage a lock knob 98. Rotation of the knob 98 squeezes the U-bar 97 against the guide rail 15 to inhibit travel of the saw mount assembly 16.

It will be understood that in order to properly orient the saw mount assembly 16 in making a vertical cut or any other cut involving movement along the guide rails 15 that appropriate scale markings (not shown) should be engraved along the edges of said guide rails 15. In order to accurately position the saw guide 14 at a precise angle to the vertical, suitable angular measurement means (not shown) may be integrally incorporated in the apparatus. For example, this might take the form of brackets attached to the support plates 28 and 29 having protractor markings inscribed thereon. Finally, it should be understood that in a manner well-known to the art scale markings may be associated with this apparatus to accurately measure the horizontal travel of either or both ends of the saw guide.

In order to secure the sheetboard against vibration and chatter during cutting operation, it will be convenient to install "hold down" fingers bracketed (not shown) to the underside of the turntable 19 so that they project against the work. Such an arrangement would permit such "hold down" fingers to swivel with rotation of the turntable 19.

It should finally be noted that the apparatus of this invention is not limited in use to cutting of lumber. It may readily be employed, for example, to cut or drill metal pipe, plastic sheets, glass or other materials adapted to rest against the support frame 10 and on the fence 12. This is made possible by appropriate adjustment of the lateral clearance between the tool mounting means, such as saw mount assembly 16, and the work.

Although a preferred embodiment of this invention has been described with considerable particularity, it is to be understood that various modifications in the structure and arrangement of parts as described above may be made without departing from the scope and spirit of the invention, as specifically identified in the claims appended hereto.

We claim:

1. A sheetboard cutting machine comprising:
   a. an upstanding support frame;
   b. a horizontal fence mounted frontally to said support frame and adapted to carry said sheetboard thereon edgewise;
   c. a saw guide extending upwardly and across the front of said support frame in spaced parallel relation thereto;
   d. a saw mounting assembly slidably mounted upon said saw guide;
   e. means mounted upon said saw mounting assembly for rotatably carrying the saw, whereby the saw can be selectively angularly rotated with respect to said saw guide;
   f. means for movably carrying the saw guide upon the support frame, whereby the saw guide can be moved upon said support frame in a plane parallel thereto, to enable a horizontal cut to be made in the sheetboard without advancement thereof; and
   g. means rotatably interconnecting said saw guide carrying means and said saw guide, whereby said saw guide can be rotated in a plane parallel to said support frame.

2. A sheetboard cutting machine comprising:
   a. an upstanding support frame;
   b. a fence extending in a horizontal plane mounted frontally to said support frame and adapted to carry said sheetboard thereon edgewise;
   c. a saw guide extending upwardly in front of said support frame in spaced parallel relation thereto;
   d. a saw mounting assembly supported on said saw guide for slidable movement therealong;
   e. means interconnected between the top and the bottom of the support frame and the respective extremities of the saw guide for supporting said saw guide in horizontally slidable relation to the support frame, and
   f. means for rotating said saw guide in a plane parallel to the support frame through a predetermined angle with respect to the vertical.

3. A machine as defined in claim 2 additionally including means for varying the clearance between the saw guide and the support frame.

4. A machine defined in claim 2 wherein said means for supporting the saw guide comprises:
   a. a top and a bottom track extending across said support frame, each of said tracks defining parallel upper and lower horizontally extending edges in vertical alignment;
   b. an upper and lower support plate connected to the saw guide adjacent the upper and lower extremities respectively thereof, said upper and lower support plates lying in vertical planes intermediate said saw guide and said top and bottom tracks; and
   c. roller means extending on horizontal axes from the rear surfaces of said upper and lower support plates, said roller means being adapted to cooperatively engage said upper and lower track edges for transport of said saw guide therealong.

5. A device as in claim 4 additionally including means for adjusting the vertical position of the top track with respect to said support frame.

6. A machine as defined in claim 5 wherein said saw guide comprises a pair of parallel guide rails and wherein said means for rotating said saw guide comprises a top and a bottom vertically extending pivot plate interconnected between said guide rails in facing relation to said upper and lower support plates respectively and adapted to pivot about said upper and lower support plates on horizontally extending axes.

7. A machine as in claim 6 additionally comprising a pair of parallel upwardly extending sleeves forwardly mounted on said upper pivot plate, said sleeves being adapted to receive and slidably support therein said guide rails, said bottom pivot plate being fixed in relation to said guide rails, whereby when said upper and lower pivot plates are pivoted about said upper and lower support plates, said guide rails are enabled to move longitudinally within said pair of sleeves.

8. A machine as in claim 6 additionally comprising first means for locking said upper and lower pivot plates in fixed relation to said upper and lower support plates respectively when said guide rails are in a vertically extending position and second means for locking said guide rails in fixed relation to said pair of sleeves in any angular position occupied by said guide rails.

9. In a sheetboard cutting machine of the type including an upstanding work supporting frame, a pair of parallel guide rails extending upwardly across said supporting frame, and a saw mount assembly supported by said guide rails for slidable movement therealong, the improvement wherein said saw mount assembly comprises:

a. a rectangular baseplate having a circular opening therethrough said base plate including a guide rail engaging bracket mounted at each corner thereof, a plurality of positioning screws extending from said brackets radially inward to the surface of the respective guide rails engaged by said brackets and a load transmitting ball-bearing mounted within the extremity of each of said positioning screws facing the surface of said respective rails, whereby, through selective adjustment of said positioning screws, said base plate may be aligned parallel to the plane of the sheetboard;

b. a one piece turntable resting on said base-plate and overlapping said opening, said turntable being provided with a plurality of radially extending peripheral notches at predetermined intervals;

c. roller means extending above the surface of the baseplate adjacent said opening adapted to support said turntable edgewise for rotation about its center;

d. means mounted on said baseplate in confronting adjacent relation to the edge of said turntable adapted to releasably and selectively engage said peripheral notches.

10. A device as in claim 9 including a lock ring interconnected with said baseplate and surrounding one of said guide rails passes, and means for tightening said ring against said guide rail to prevent further slidable movement of said saw mount assembly.

* * * * *